United States Patent [19]

Link et al.

[11] 4,213,173

[45] Jul. 15, 1980

[54] POLARITY-AND-LOAD INDEPENDENT CIRCUIT ARRANGEMENT FOR CONVERTING ELECTRICAL ENERGY

[75] Inventors: Klaus Link, Munich; Werner Lochter, Emmering, both of Fed. Rep. of Germany

[73] Assignee: Siemens Aktiengesellschaft, Berlin & Munich, Fed. Rep. of Germany

[21] Appl. No.: 911,719

[22] Filed: Jun. 2, 1978

[30] Foreign Application Priority Data

Jun. 23, 1977 [DE] Fed. Rep. of Germany ....... 2728377

[51] Int. Cl.² .......................................... H02M 5/293
[52] U.S. Cl. ..................................... 363/163; 363/171
[58] Field of Search .................... 363/20, 21, 71, 157, 363/159, 160, 163–165, 171

[56] References Cited

U.S. PATENT DOCUMENTS

| | | | |
|---|---|---|---|
| 3,351,839 | 11/1967 | Johnson | 363/133 |
| 3,517,300 | 6/1970 | McMurray | 363/163 X |
| 3,564,390 | 2/1971 | Stratton | 363/159 |
| 3,678,367 | 7/1972 | McMurray | 363/10 |
| 4,019,114 | 4/1977 | Huellwegen | 363/21 |

Primary Examiner—William M. Shoop
Attorney, Agent, or Firm—Hill, Van Santen, Steadman, Chiara & Simpson

[57] ABSTRACT

A circuit arrangement for converting electrical energy has a static frequency converter which operates with a considerably higher frequency than the frequency to be produced, the arrangement has a heavy-duty switch, a transmitter and a rectifier on the secondary side, and a master control circuit, a regulating circuit and an auxiliary static frequency converter. The heavy-duty switches on the primary side and on the secondary side are provided for the two current directions with one transformer winding of a common transformer, and are also provided with filter sections for the low frequency range and high frequency range auxiliary frequency converters. The arrangement also is provided with quadrant shift locks at the primary side and the secondary side which determine the mode of operation of the static frequency converter in conjunction with the master circuit and the regulating circuit, whereby the output flow direction can be selected or is determined by a monitoring circuit.

22 Claims, 8 Drawing Figures

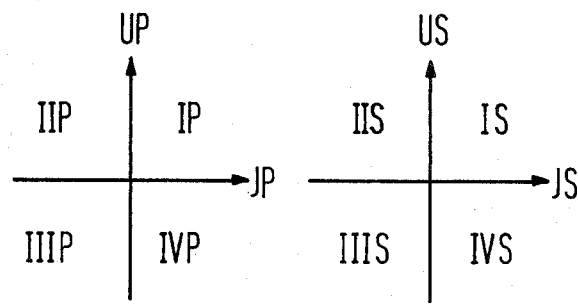
Fig.1
Fig.3
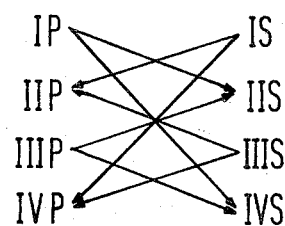
Fig.4
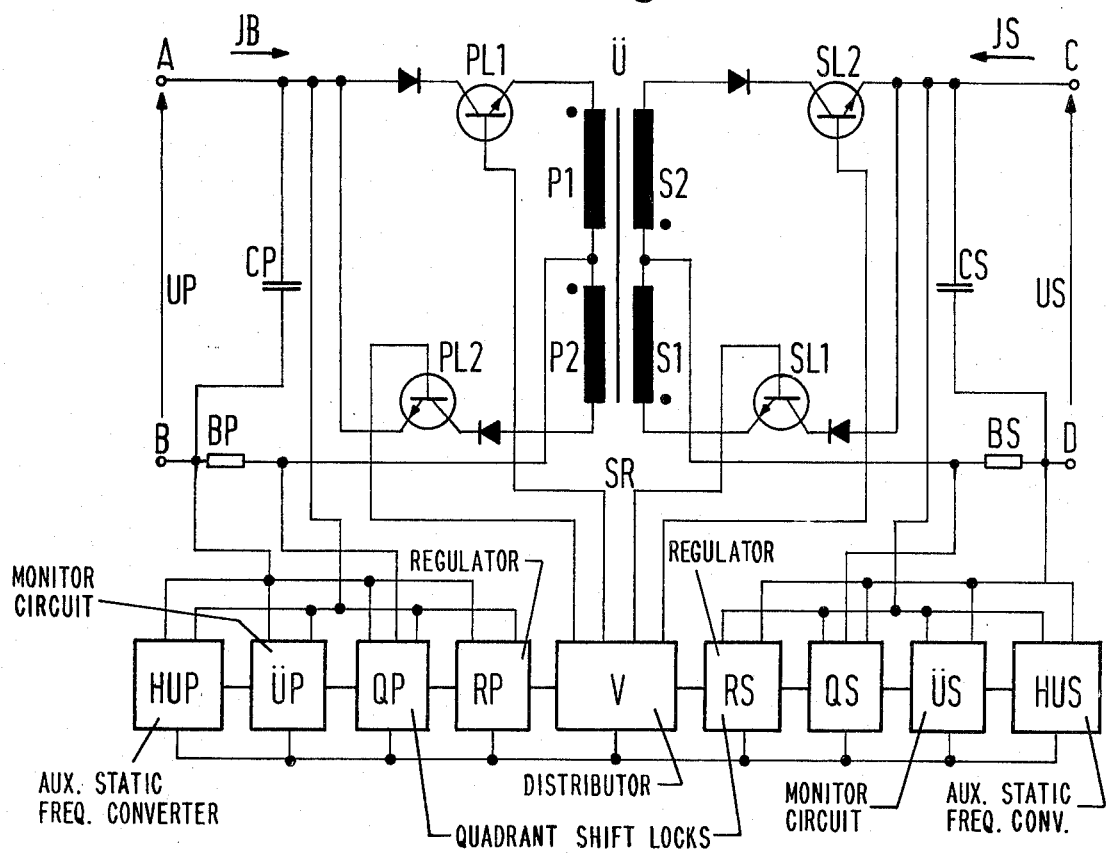
Fig.2

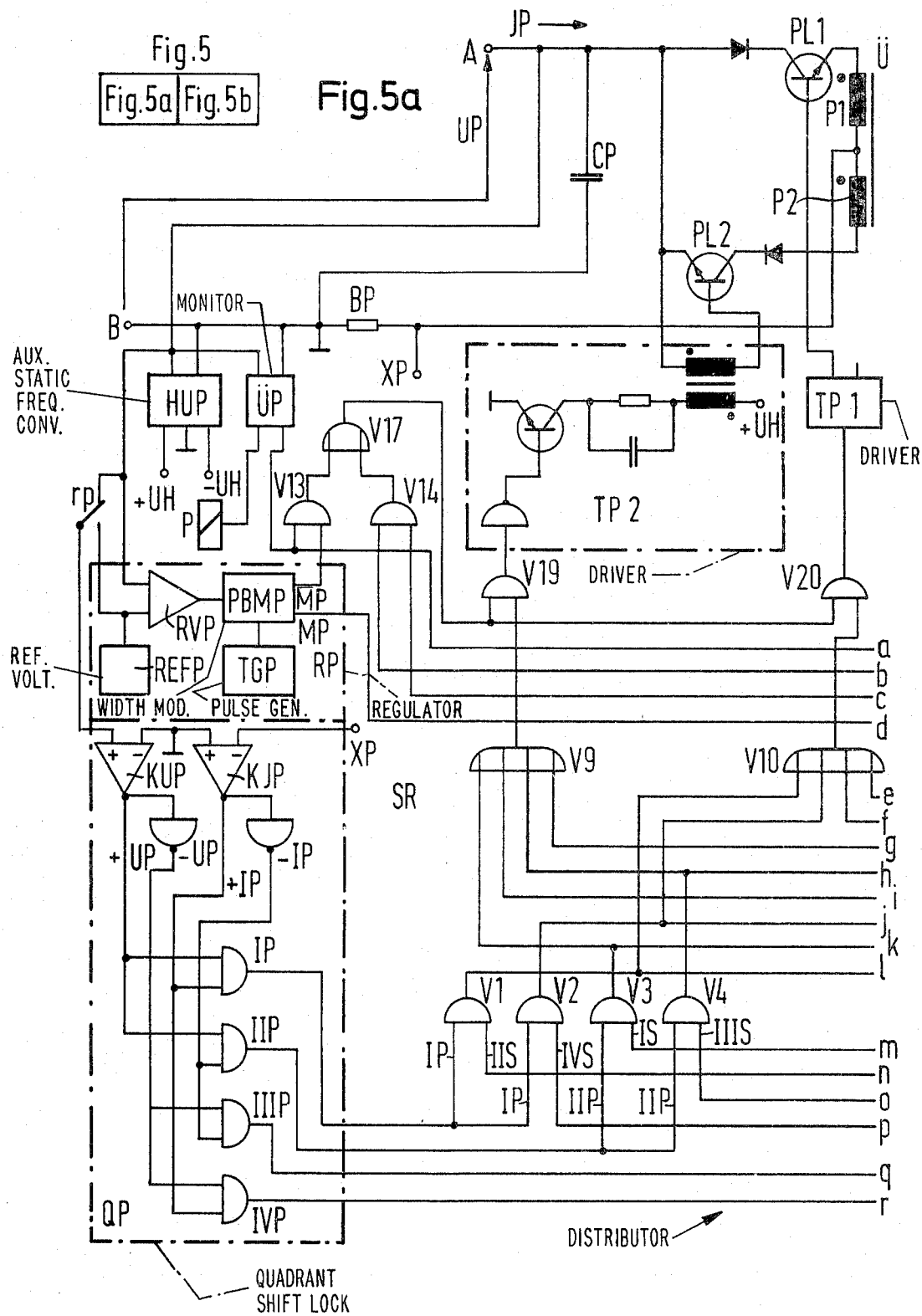

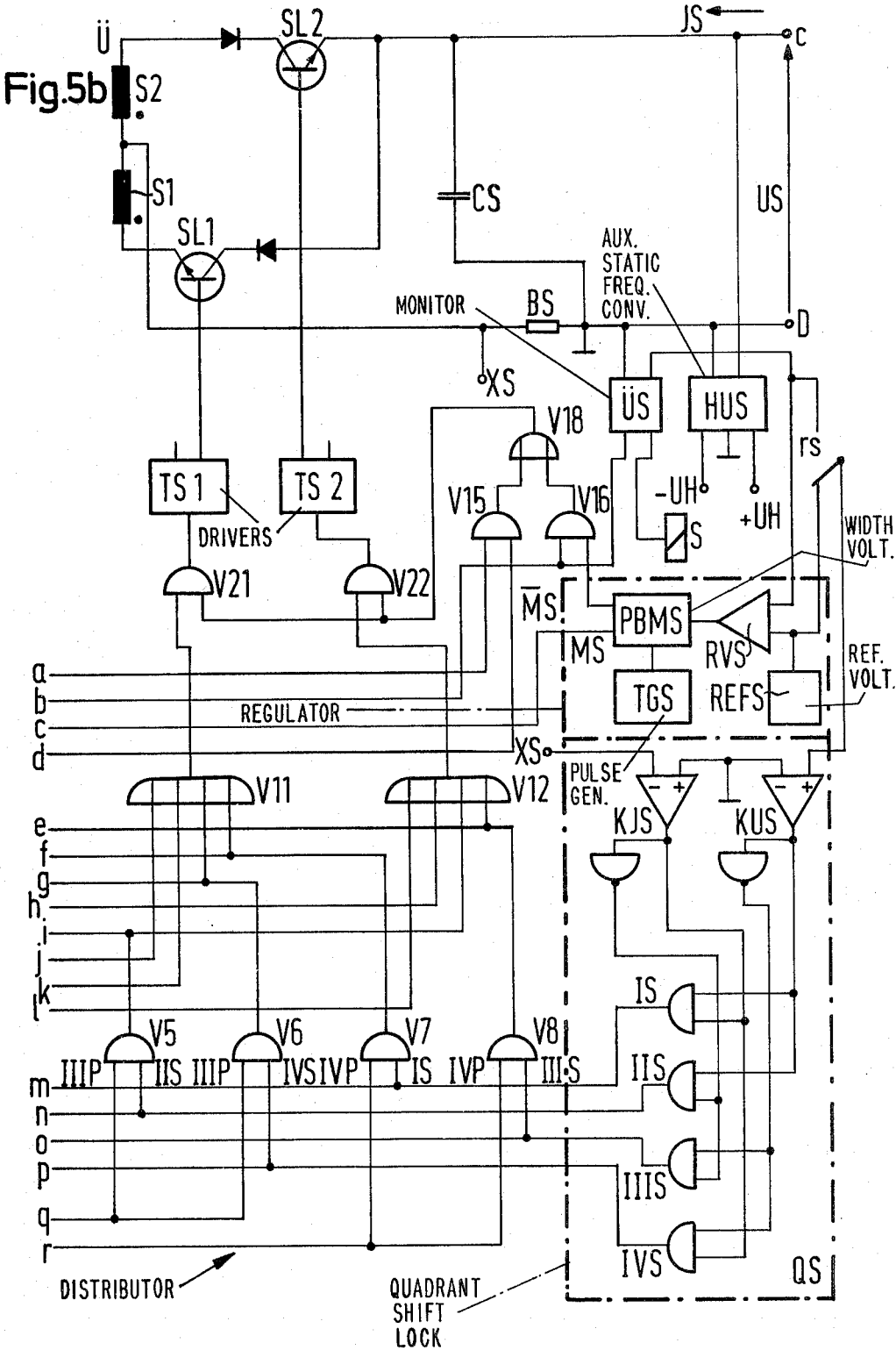

POLARITY-AND-LOAD INDEPENDENT CIRCUIT ARRANGEMENT FOR CONVERTING ELECTRICAL ENERGY

BACKGROUND OF THE INVENTION

Field of the Invention

The present invention relates to a circuit arrangement for the conversion of electrical energy with the aid of a static frequency converter which operates with a considerably higher frequency than the frequency to be produced, and more particularly to such an arrangement which has a heavy-duty switch at the primary side, a transformer and rectifier components at the secondary side, and a master control circuit, a regulating circuit and an auxiliary static frequency converter.

SUMMARY OF THE INVENTION

The object of the present invention is to provide a circuit arrangement of the type generally described above which permits all types of conversion of electrical energy with a high degree of efficiency, and to provide a circuit arrangement of this type which has a small and easy construction, in which the energy direction can be reverted so that a complete four-quadrant operation is possible in two output directions.

Referring to FIG. 1, the four-quadrant operation is explained. In order to characterize th possible operating ranges of static converters, connected at the output side or at the input side with a DC current system, the current-voltage plan of the DC current system can be divided into four quadrants IP–IVP in accordance with the respective signs of the DC voltage UP and the DC current JP. Equal signs of DC current and DC voltage mean that the output flow proceeds from input to output. This is the case in accordance with the illustration in FIG. 1 in quadrants IP and IIIP. If, however, DC current and DC voltage have opposite signs, power flows from output back into input. This holds true for the quadrants IIP and IVP.

The object of the present invention is accomplished in that heavy-duty switches of the primary side and the secondary side are respectively provided with a transformer winding of a common transformer, filter sections for low frequency and high frequency ranges and auxiliary static frequency converters, and also quadrant shift locks at the primary side and the secondary side in conjunction with a master control circuit and a regulating circuit which determines the mode of operation of the static frequency changer, whereby the output flow direction can be selected, or it can be determined by a monitoring circuit.

Components can be utilized as heavy-duty switches, whose current flow is determined by way of a control electrode and which, moreover, retain their blocking ability even with inverse operation. If bipolar transistors are utilized, a diode must be connected to the transistor in series therewith in order to protect against inverse operation. The master control circuit and the regulating circuit, for example, may comprise, respectively, an auxiliary static frequency converter, a regulating circuit and a distributor circuit constructed of gates, for example, in conjunction with quadrant shift locks.

A circuit arrangement has been constructed in accordance with the solution set forth above and in accordance with the present invention which is practically equal to eight individual static frequency converters (see FIG. 4). It is possible to convert a DC voltage into a different DC voltage with the aid of such a circuit arrangement, whereby the poling of the input and output voltage and also the output flow direction can be selected. Moreover, the static frequency converter, when surge voltages or a confusing of the poles at the output of the static frequency converter occurs, due to a foreign interference, can be controlled such that the surge voltage or the pole confusing voltage is fed back into the input by way of the static frequency converter. Moreover, a transformation of DC voltage into AC voltage is possible. The polarity of the input voltage is thereby freely selectable. In this case of utilization, purely ohmic loads, but also mixed or even purely inductive or purely capacitive loads can be connected, as all four quadrants can be traversed with the aid of the quadrant shift locks.

The circuit arrangement can additionally be employed for frequency transformation. In this construction, an output frequency f2 which is higher, equal or lower than the input frequency f1 can be produced (f1 ≦ f2 ≦ f1). Thereby, the maximum input frequency f1 and the maximum output frequency f2 is only limited by the operating frequency of the static frequency changer.

A universal circuit arrangement constructed in accordance with the present invention can be adjusted to specific and fixed utilization situations. Thus, for example, with an input voltage of constant polarity and an abandonment for reversible output flow, only one heavy-duty switch and only one transformer winding is necessary for the primary side. In this case, only one auxiliary static frequency converter fed by the primary input voltage is required. However, this simplified circuit arrangement still permits the production of output voltages having alternating polarity. In reverse, it is possible that with an input voltage alternating in polarity, however, constant output polarity, only one transformer winding and one heavy-duty switch is necessary at the secondary side. Depending upon the mode of operation desired, only one quadrant shift lock need be arranged at the primary side or the secondary side. If, for example, the input polarity cannot alter, the primary quadrant shift lock is dropped.

If a great input voltage range or output voltage range is to be exceeded, a blocking transducer is particularly suited as a static frequency changer. A one-phase flow-through transducer or a push-pull flowthrough transducer advantageously can be utilized with a great transferable output.

In accordance with a further development of the invention, respectively one regulating circuit is assigned for the primary side and the secondary side prescription of an output voltage, whereby a pulse width modulator, a pulse generator, etc. can doubly be utilized. The advantage of a two-sided, i.e. primary and secondary sided, regulating circuit is that a regulated voltage, independent of the load and the supply voltage in wide ranges, may be provided and in that with the two-fold utilization of various components, a simple resolution is nevertheless obtained.

In accordance with another embodiment of the invention, the regulating circuit comprises a reference signal generator, a theoretical-actual value comparator, a pulse width modulator and a pulse generator, whereby the output signal of the pulse width modulator effects the heavy-duty switches, via gate circuits, and drivers, and the voltage given off at an integrating element from the transformer via the heavy-duty switch is again fed to the theoretical-actual value comparator. The reference signal generator is a DC voltage source when DC voltages are produced, and is an AC voltage generator when AC voltage is produced. A corresponding selection of the reference generator, in conjunction with the regulating circuit, permits the production of DC voltages and not only sine-shaped AC voltages, but also voltages of other random waveform.

A particular embodiment of the invention resides in the provision of a pulse generator which operates with a considerably higher frequency than the output frequency to be produced, and actuates the pulse width modulator which derives pulse-width modulated rectangular signals from the output signal of the theoretical-actual value comparator, the rectangular signals being present in inverted form at another output.

It is thereby possible to utilize particularly small transformers and filters, as the selection of the transformer and the filters is not determined by the frequency to be produced, but rather by the pulse generator frequency.

Circuit arrangements constructed in accordance with the invention can be designed such that direction-sensitive amplification elements, for example, a comparator, are provided for the voltage direction and the current direction as the quadrant shift locks, whose outputs provide signals, via gate circuits, these signals corresponding to the individual quadrants. Subsequent additional gate circuits take care of a correct assignment of the output signals of the quadrant shift locks and of the pulse width modulators with respect to the heavy-duty switches. The correct mode of operation of the static frequency converter is thereby always obtained independently of whether ohmic or mixed loads are connected. In this manner, the range of employment of the circuit arrangement is not limited to a particular load device. However, a pulse edge-controlled flip-flop can be used as a direction-sensitive amplifying element, primarily for the current direction determination, the flip-flop only responding to the direction alteration of the current value at a zero passage time.

According to another embodiment of the invention, drivers are provided for effecting a potential separation between the primary side and the secondary side, to provide the heavy-duty switches with switch-on or switch-off currents.

In order to avoid a defective mode of operation of the static frequency converter and the endangering of the transistor heavy-duty switches, at the time of switching, the rearranging of the output flow direction or of the polarity proceeds synchronously with the pulse generator in accordance with a further development of the invention. It is thereby necessary to insert, for example, a flip-flop between the drivers and the master control circuit, which is prepared by the signal of the quadrant shift lock and is not brought into its other condition until a signal of the pulse generator is received.

A different specific embodiment of the invention is that each heavy-duty switch exhibit a protective device against surge voltages and currents which are too large. A Zener diode, for example, can be connected in parallel to the heavy-duty switch, the diode protecting the heavy-duty switch from surge voltages, or the heavy-duty switch is blocked with the aid of a current measuring device and an evaluation circuit when the current is too high. Such a protective circuit has the advantage that a synchronous switching of the output flow direction or of the polarity by the pulse generator is not necessarily required.

In accordance with another embodiment of the invention, a choke having two windings is provided instead of the transformer. This solution has the advantage that it represents a particularly simple construction when no potential separation is required. An unregulated input DC voltage or AC voltage, for example, could be converted into a regulated DC volage or AC voltage in this manner.

Respectively, one current limitation device on the primary side and on the secondary side could also be provided in the circuit arrangement of the present invention to interlock the master control circuit and the regulating circuit for both directions, i.e. when an output is given off or taken up, in such a manner that a destruction of the static frequency converter output components is avoided.

In accordance with a further embodiment of the invention, an emergency power battery is arranged at the output side, along with the load, the battery which, when a breakdown of the primary supply voltage via the static frequency converter occurs, feeds back to the input and thereby supplies additional load devices connected to the input. This solution permits the supplementation of an emergency power battery in current supply systems in a particularly simple manner without having to adjust additional load devices, also supplied by the network, to the battery voltage.

A rectifier arrangement can additionally be provided in the framework of the invention in order to decouple the static frequency converter or additional load devices between the network and the input side, the rectifier arrangement keeping the feedback voltage from the network side.

Instead of the rectifiers, contacts or AC voltage heavy-duty switches, constructed from semiconductors, can be provided in the circuit arrangement constructed in accordance with the present invention, which interrupt the network feed supply in the case of feedback.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a graphic illustration of four-quadrant operation of a converter;

FIG. 2 is a schematic circuit diagram of a circuit arrangement which operates with a static frequency converter in accordance with the blocking transformer principle, whereby transistors with diodes connected in series therewith are utilized as heavy-duty switches;

FIG. 3 is a graphic illustration of a quadrant plane of the secondary side, analogous to FIG. 1, which illustrates the quadrant plan of the primary side;

FIG. 4 is a graphic illustration which symbolizes all possible transmission paths;

FIG. 5 is a schematic illustration of the association of FIGS. 5a and 5b which together form a schematic circuit diagram of a static frequency converter which operates in accordance with the blocking transformer princple.

DESCRIPTION OF THE PREFERRED EMBODIMENTS

Figure 6:
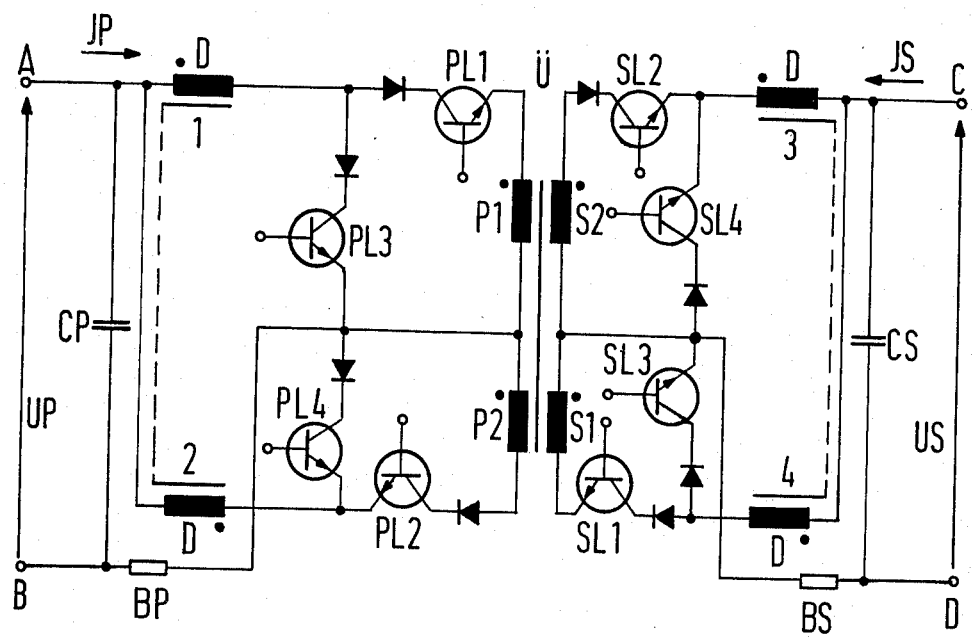
FIG. 6 is a schematic circuit diagram of an exemplary embodiment of a one-phase flowthrough converter.

In FIGS. 2, 5, 5a, 5b and 6, the input side is characterized at AB, as receiving an input voltage UP, with an input current JB, and the output side is characterized at CD as having an output voltage US and an output current JS. The arrows at the input and output define the voltage and current direction. Filter elements for a low pass range and a high pass range at the input side and the output side are not illustrated on the drawings. Current measuring devices BP and BS and charging capacitors CP and CS are provided at the input side and the output side, respectively. At one end of a transformer Ü in FIG. 2, which transformer has four windings P1, P2, S1, S2, whose polarities are respectively referenced by a dot, heavy-duty switches PL1, PL2 and SL1, SL2 are connected to form the primary input pole and the secondary output pole, respectively. The other ends of the transformer windings are connected to the second input pole and the second output pole, respectively.

Auxiliary static frequency converters HUP, HUS are connected at the primary and secondary sides, respectively, along with a respectively monitoring circuit UP, US, a respective regulating circuit RP, RS and a common distributor circuit V, in conjunction with quadrant shift locks QP and QS, respectively, associated with the regulating circuit SR of FIG. 2.

FIG. 3, in accordance with FIG. 1, illustrates the quadrant plane of the secondary side.

FIG. 4 illustrates all possible transmission paths between the individual quadrants of the primary side and the secondary side, whereby the output direction is respectively characterized with arrows.

The function of the circuit arrangement illustrated in FIG. 2 is explained below for an output transmission between the primary quadrant IP in relation to the secondary quadrant ILS.

Energy is received by the output winding P1 of the transformer Ü, determined by the master control circuit and the regulating circuit SR, via a conductive heavy-duty switch PL1, the energy being subsequently emitted to the output US by way of the transformer winding S2 when the heavy-duty switch SL2 is conductive.

In reverse, in dependence upon the master control circuit and the regulating circuit SR, having a conductive output switch SL1, when an output transmission from the secondary quadrant IS is to take place to the primary quadrant IIP, energy is received by the transformer winding S1 and is subsequently provided to the input UP by way of the winding P2 when the heavy-duty switch PL2 is conductive.

The output transmission in the remaining six transmission directions proceeds in an analogous manner.

The specific task of the individual circuit components of the master circuit and regulating circuit SR is explained in conjunction with FIG. 5.

The output component of FIG. 5 is identical with the output component of FIG. 2.

The auxiliary static frequency converters HUP and HUS are static frequency converters of a well-known type, providing supply voltage +UH and −UH in order to supply the complete master circuit, and whose outputs are connected in parallel in order to guarantee a supply of the master circuit independently of the output direction.

Monitoring circuits UP and US, having respective relays P and S, determine the main output direction. A reference element is arranged in the monitoring circuit which monitors the input voltage or the output voltage with the aid of an evaluation circuit and rearranges the main output direction of the static frequency converter from the secondary side in direction to the primary side when, for example, the input voltage is too low. The contacts rp and rs, respectively, are used for this purpose, which apply the comparator to the input voltage/output voltage or to the reference voltage REFP/REFS, respectively, for the voltage direction KUP and KUS, respectively. An additional output of the monitoring circuit controls the correct assignment of the output voltages of the pulse width modulators PBMP and PBMS by way of gate circuits V13-V18 to the heavy-duty switches via the drivers TP1, TP2 and TS1, TS2.

The regulating circuits RP and RS also contain a theoretical-actual value comparator RVP and RVS, respectively, and a pulse generator TGP and TGS, respectively, in addition to the reference and pulse width modulators.

An additional comparator for the current direction KJP, KJS is provided with the comparator for the voltage direction KUP in the quadrant shift locks QP, QS, the additional comparators being controlled by respective impedances BP and BS. The output signal of the comparators determine the quadrants IP–IVP and IS–IVS in conjunction with gates connected to the output side. The distributor circuit, consisting of the gates V1–V12, selects the drivers and heavy-duty switches to be actuated from the output signals via additional gates V19–V22.

The function of the circuit arrangement in accordance with FIG. 5 will now be explained for an output transmission from the primary quadrant IP to the secondary quadrant IIS. For this purpose it is assumed that the monitoring circuit has not responded on the primary side or that, respectively, the secondary monitoring circuit has responded. This occurs with the illustrated position of the contacts rp and rs.

The quadrant shift lock QP will therefore emit a signal at its output IP. Accordingly, the quadrant shift lock QS will provide a signal at its output IIS. Thereby, the AND gate VI will actuate the two OR gates V10 and V12. The output signals of the gates V10 and V12 provide signals to the respective inputs of the gates V20 and V22. The second input of the gate V20 receives an output signal MS of the pulse width modulator PBMS by way of the gates V17 and V14. The second input of the gate V22 receives an input signal MS of the pulse width modulator PBMS by way of the gates V18 and V16. The output signals of the gates V20 and V22, respectively, actuate the respective drivers TP1 and TS2. A transistor is connected in the drivers, in addition to an inverter, the transistor having a collector which is connected to an operating voltage by way of a winding of a pulse transformer and an impedence (a resistor) and a capacitor connected in parallel therewith. The second winding of the pulse transformer is directly connected to the respective base and to the emitter of the respective heavy-duty switch. Thereby, the transformer in the driver operates in accordance with the blocking transformer principle.

The amount of output voltage in this transmission direction is prescribed by the secondary reference REFS and compared with the output voltage US by the theoretical-actual value comparator RVS, and is held constant and regulated independently of the input voltage alterations and load fluctuations.

The energy transmission, control and regulation in the other seven transmission directions proceed in an analogous manner.

FIG. 6 illustrates an output component constructed in accordance with the flowthrough transformer principle. In FIG. 6 it can be seen that also only one output transformer Ü, and additionally one output choke D having four windings 1, 2, 3, 4 are utilized. In addition to the blocking transformer, the zero diodes in the flowthrough transformer must also be replaced by heavy-duty switches PL3, PL4 and SL3, SL4.

The mode of operation is described with the example of an output transmission from the primary quadrant IP to the secondary quadrant IIS. Energy is thereby transmitted from the primary side to the secondary side when the heavy-duty switch PL2 is conductive and simultaneously the heavy-duty switch SL2 is conductive. Subsequently, the energy stored in the choke is also emitted to the output when the heavy-duty switch SL4 is conductive. For this purpose, the master control circuit at the output, described with respect to FIG. 5, must be increased by the driver circuits in order to actuate the four heavy-duty switches PL3, PL4, SL3, SL4.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modification as may reasonably and properly be included within the scope of our contribution to the art.

We claim:

1. A circuit arrangement for converting electrical energy with the air of a static-frequency converter which operates at a higher frequency than the frequency to be produced, comprising:
   a static frequency converter including a primary side winding means and a secondary side winding means;
   a plurality of rectifiers and a plurality of heavy-duty switching transistors, said rectifiers connected in series with a respective switching transistor and a respective transformer winding means and poled for a respective current direction;
   a primary side input connected to two of the rectifier-transistor series combinations;
   a secondary side output connected to another two of the rectifier-transistor series combinations;
   first high pass and low pass filters connected to said primary side input;
   second high pass and low pass filters connected to said secondary side output; and
   master control means connected to said transistors, to said primary side input and to said secondary side output for determining the output flow direction, said master control means including
   first and second regulating circuits connected to said input and output, respectively, and operable to provide regulation of the output voltage independently of the input voltage and load changes,
   first and second quadrant shift locks connected to said input and output, respectively, for providing output signals indicative of input and output current and voltage directions,
   first and second auxiliary frequency converters connected to said input and output, respectively, for deriving operating voltages for said circuit arrangement,
   first and second voltage monitoring circuits connected to said input and output, respectively, and to the respective regulating circuits and quadrant shift locks and operable to indicate the input and output polarities,
   a distributor circuit connected to said plurality of transistors and connected in circuit with said auxiliary frequency converters, said quadrant shift locks, said monitoring circuits and said regulating circuits, and operable in response to the outputs of said monitoring circuits, said regulating circuits and said quadrant shift locks to selectively operate said transistors and determine the output flow direction.

2. The circuit arrangement of claim 1, wherein said static frequency converter includes a transformer connected to operate as a blocking transformer.

3. The circuit arrangement of claim 2 wherein said transformer includes serially-connected primary windings and serially-connected secondary windings.

4. The circuit arrangement of claim 1, wherein said static frequency converter comprises a one-phase flowthrough transformer.

5. The circuit arrangement of claim 1, wherein said static frequency converter comprises a push-pull flowthrough transformer.

6. The circuit arrangement of claim 1, wherein said regulating circuits each comprise a pulse width modulator connected to the respective auxiliary frequency converter and to the respective input and output and to the respective monitoring circuit, and a pulse generator connected to said pulse width modulator.

7. The circuit arrangement of claim 6, wherein each of said regulator circuits also comprises
   a reference signal generator, and
   a reference-actual value comparator connected to said reference signal generator, to said monitoring circuit and to said pulse width modulator,
   and wherein said distributor circuit comprises
   gate means connected to and operated by said pulse width modulators and said quadrant shift locks, and
   drivers connected between said gate means and said heavy-duty switching transistors,
   and wherein said input and said output each comprise an integrating element connected to the respective comparator.

8. The circuit arrangement of claim 7, wherein said reference signal generator produces a D.C. reference signal for D.C. voltages applied to said comparator from said input.

9. The circuit arrangement of claim 7, wherein said reference signal generator produces an A.C. reference signal for A.C. voltages applied to said comparator from said input.

10. The circuit arrangement of claim 7, wherein said pulse generator operates at a higher frequency than the frequency to be produced and wherein said pulse width modulator includes means actuated by said pulse generator to derive pulse width modulated rectangular signals and inversions of such signals from the output signal of said comparator.

11. The circuit arrangement of claim 1, wherein each of said quadrant shift locks comprises direction-sensitive amplifiers for detecting the respective voltage and current directions and producing quadrant indicative signals to said distributor circuit.

12. The circuit arrangement of claim 11, wherein said distributor circuit comprises
gating means connected to said quadrant shift locks and to said regulating circuits for the correct assignment of regulation signals and quadrant signals to said switching transistors.

13. The circuit arrangement of claim 1, wherein said distributor circuit comprises
driver circuits connected to provide switching signals to said transistors.

14. The circuit arrangement of claim 1, wherein said master control means comprises:
a pulse generator connected in circuit with said distributor circuit for causing synchronous switching of said transistors.

15. The circuit arrangement of claim 1, comprising:
a plurality of protective devices, each connected to a respective heavy-duty switching transistor to protect the same from excessive surge voltages and currents.

16. The circuit arrangement of claim 1, wherein said static converter is constituted by a two-winding choke.

17. The circuit arrangement of claim 1, comprising:
a first current limiting device connected to said primary side input; and
a second current limiting device connected to said secondary side output.

18. The circuit arrangement of claim 1, comprising:
an emergency power supply connected to said secondary side output; and
means for feeding back said emergency power supply to said input to power all circuits connected thereto.

19. The circuit arrangement of claim 18, comprising:
a rectifier arrangement connected to said primary side input for isolating said emergency power supply and said input from a feeding network.

20. The circuit arrangement of claim 18, comprising:
decoupling means for decoupling said emergency power supply and said input from a feeding network.

21. The circuit arrangement of claim 20, wherein:
said decoupling means includes switch contacts.

22. The circuit arrangement of claim 20, wherein:
said decoupling means includes semiconductor switches.

* * * * *